Jan. 6, 1948.   J. E. CHAPMAN   2,434,034
INDUCTION MOTOR BRAKE
Filed May 29, 1944   2 Sheets-Sheet 1
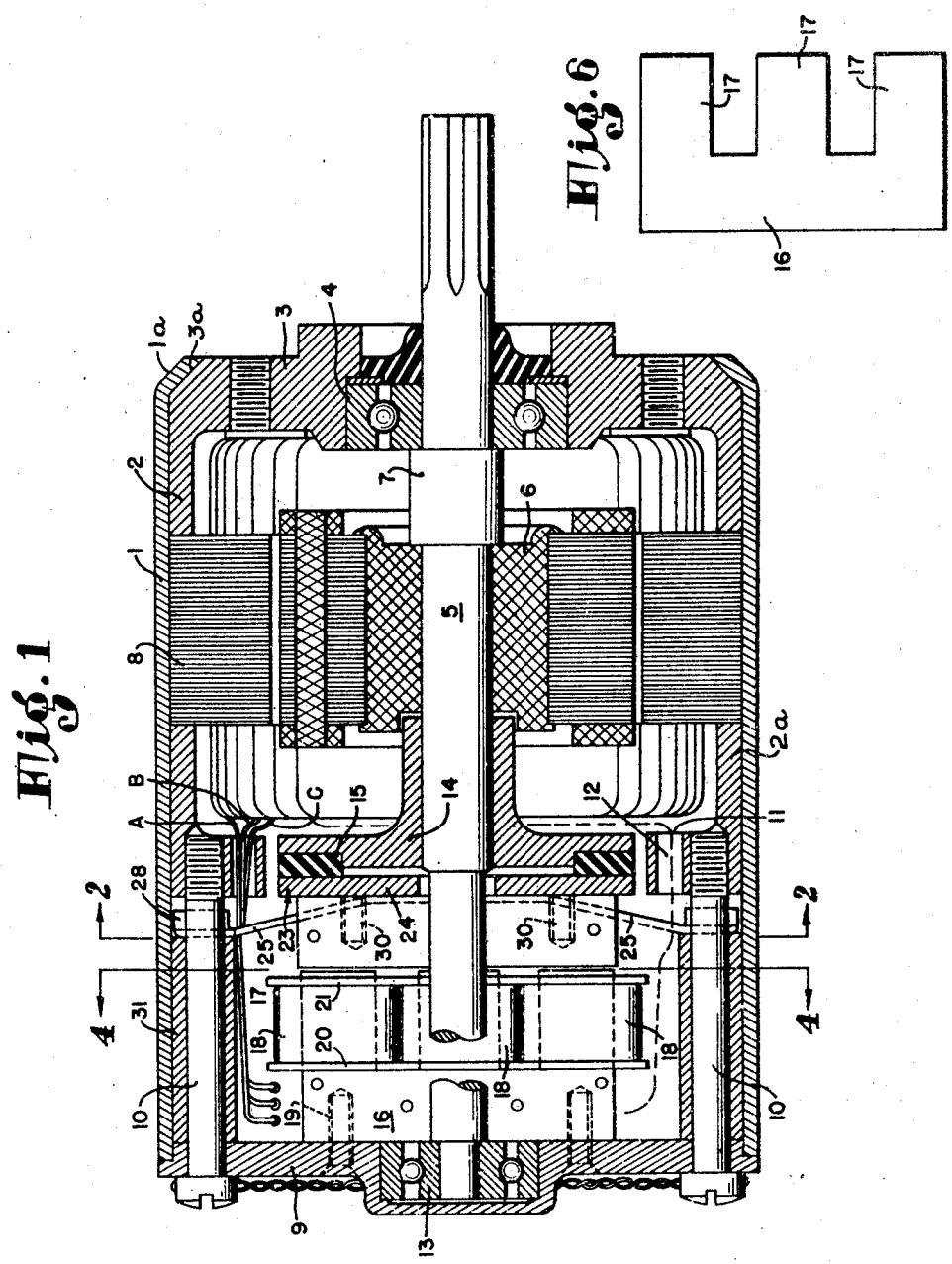
INVENTOR.
JAMES E. CHAPMAN
BY 
ATTORNEY

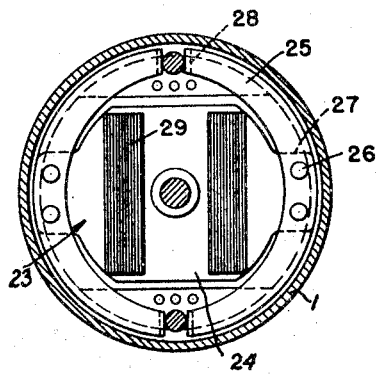
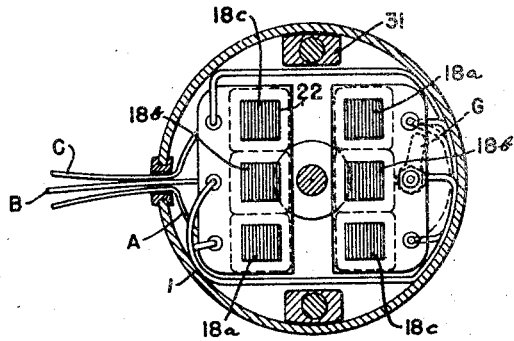
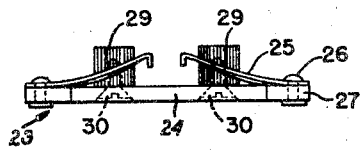
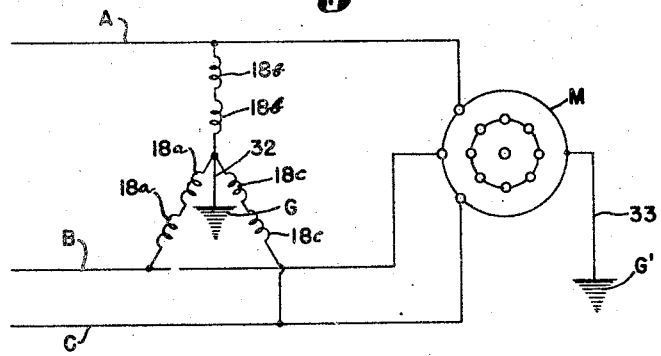

Patented Jan. 6, 1948

2,434,034

UNITED STATES PATENT OFFICE 2,434,034

INDUCTION MOTOR BRAKE

James E. Chapman, Phoenix, Ariz., assignor to The Garrett Corporation, Los Angeles, Calif., a corporation of California Application May 29, 1944, Serial No. 537,763

6 Claims. (Cl. 188—172)

This invention relates to brakes for electric motors, particularly to a brake for an induction motor or other motor operating on a polyphase alternating current, and employing a plurality of wires corresponding to the different phases.

Heretofore, electric brakes on alternating current motors controlled or actuated by the alternating current, have been unsatisfactory due to the fact that in the construction of the brake a plurality of solenoid or electro-magnets were employed, disposed circumferentially about the axis of the brake, that is to say, around the axis of the shaft of the motor, and due to the fact that the action of an alternating current passing through the electro-magnets, in series, operates to produce a revolving effect similar to the revolving field effects in induction motors, the force acting upon the brake and holding it released or unapplied, acted eccentrically to the shaft; thereby tending to produce vibration and chattering in the parts associated with the relatively movable brake member. For this reason it has been the practice to some extent to employ direct current brakes on induction motors.

One of the objects of this invention is to overcome these difficulties and to provide an electric brake for use with induction motors, which is controlled through the agency of the alternating current employed for operating the motor; also to construct the brake in such a way that when the brake is energized by the electric current, the force applied by it to the relatively movable brake member, or to any part that operates the brake, will be balanced and centralized with respect to the axis of the brake, developing a resultant force that will act along the axis of the brake and the motor shaft if, as is usual in small motors, the brake axis coincides with the axis of the shaft.

Another object of the invention is to provide a simple construction for mounting the brake magnet coils in an arrangement in which they are laid out on straight lines so as to facilitate the manufacture of the coil frames and mountings, but with the coils that are energized at the same time located diametrically opposite to each other with respect to the axis of the brake, so as to insure a substantially perfect balance of the electromagnetic forces acting upon the brake, with respect to the axis of the brake.

Another object of the invention is to provide a relatively movable brake member constructed so that it can operate as an armature, or carry an armature adapted to cooperate with the electromagnet coils having the rectilinear arrangement referred to above.

Another object of the invention is to provide a relatively movable brake member of simple construction which can be readily mounted in the cylindrical case of an induction motor, constructed so that it will be held in a free floating condition, but at the same time, held against rotation on the axis of the brake when the brake is applied to the rotating brake member or brake wheel of the motor.

Further objects of the invention will appear hereinafter.

The invention consists in the novel parts and combination of parts to be described hereinafter, all of which contribute to produce an efficient brake for induction motors.

A preferred embodiment of the invention is described in the following specifications, while the broad scope of the invention is pointed out in the appended claims.

Referring to the drawing which is for illustrative purposes only.

Fig. 1 is a longitudinal central section through an induction motor, provided with a brake embodying the present invention and illustrating the relation of the brake and its parts to the brake wheel of the motor; and showing in cross section the relatively movable brake member that is controlled by the polyphase current.

Fig. 2 is a vertical section taken about on the line 2—2 of Fig. 1 upon a reduced scale, and further illustrating the preferred details of construction of the relatively movable or floating brake member.

Fig. 3 is a side elevation of the relatively movable or floating brake member representing the same removed from the casing. This view corresponds to Fig. 2 and shows the floating brake member viewed from its lower side, to illustrate particularly the arrangement of the armature sections that are carried by the body of this brake member and also the arrangement of resilient member and also the arrangement of resilient means or springs that may be employed for biasing the floating brake member toward an extreme position.

Fig. 4 is a vertical section also taken on Fig. 1 and this section is taken on line 4—4 and particularly illustrates the mounting for the electromagnet coils that control the floating brake member. This view shows the rectilinear arrangement of the coils and their relation to the axis of the brake.

Fig. 5 is a diagrammatic view illustrating the wiring for the electro-magnets of this brake in a three wire polyphase circuit.

Fig. 6 is a side elevation of a core member such as I prefer to employ for providing the cores for the brake coils.

In the motor illustrated, 1 indicates a cylindrical casing having an inner shell 2 that is cast integrally with one of the heads 3 of the motor, which head carries one of the ball bearings 4 for the adjacent end of the motor shaft 5. Between the motor armature 6 and the bearing 4 an enlarged neck 7 is formed on the shaft. The inner shell 2 is pressed into the casing 1 to the position shown in Fig. 1, whereat the beveled face 3a of the shell 2 abuts against the inwardly inclined flange 1a of said casing. The field poles 8 are then pressed into the casing and into abutment with the inner end of the shell 2, said field poles having windings which are connected up to the three-phase conductors A, B, and C. The second shell 2a is pressed into the casing and into abutment with the adjacent end of the field poles 8, said shell 2a being secured in the casing 1 by screws, not shown. The inner shells 2 and 2a comprise the field pole securing and positioning means.

The other end of the motor casing includes a head 9 which is countersunk into the end of the casing and secured in place by a pair of diametrically opposite tie bolts 10, the inner ends of which are threaded into chords or webs 11 that project inwardly from the adjacent end of the inner shell 2a. These webs 11 may be formed with passages 12 through which the conductors A, B and C may be threaded.

The head 9 is provided with a ball bearing 13 at the adjacent end of the shaft. This end of the shaft is of slightly reduced diameter as compared with the body portion of the shaft that carries the armature 6.

On the left end of the body of the shaft 5, a brake member or brake wheel 14 is rigidly secured to the shaft, said brake member being provided with a countersunk annular liner 15 of any material suitable for this purpose.

On the inner face of the head 9 I attach multiple laminated core members 16, each having a plurality of cores or poles extending integrally therefrom longitudinally with the axis of the shaft. In the present instance, there are three of these pole extensions or cores 17, and each of these extensions operates as a core for a corresponding coil 18.

There are two of the core members 16, one located on each side of the shaft (see Fig. 4). They are secured to the head 9 by any suitable means, such as means of countersunk machine screws 19. The coils are mounted between end plates 20 and 21, which have holes 22 punched in them through which the ends of the cores 17 project on the side toward brake wheel 14.

In the space between these cores 17 and the brake wheel 14 the relatively movable or floating brake member 23 is mounted. This brake member is shown in detail in Figs. 2 and 3. It includes a brake disc or body 24, the forward face of which is adapted to be pressed against the rotary brake member 14 to stop the rotation of the shaft.

This floating brake member is biased toward an extreme position. In the present instance, it is biased toward the rotary brake member by resilient means preferably consisting of two arcuate or segmental leaf springs 25, the middle portions of which are attached by fastening devices 26 to radial lugs 27 that project outwardly from the disc body 24 of the brake member 23; and the free ends of these springs 25 abut against means for holding the floating brake against rotation. In order to accomplish this, these brake springs are extended substantially half way round the interior of the cylindrical casing, their ends being provided with integral flanges 28 bent up and resting against the sides of the tie bolts 10 (see Fig. 2).

On the face of the disc 24 two armature sections 29 are attached by means of countersunk machine screws 30 and these armature sections are preferably of laminated form. These two sections are located at an equal distance from the shaft and each section is located directly opposite to the projecting cores 17 of one of the core members 16.

In the present brake, when the motor is running, the current is passing through and energizing the coils 18 so that the floating brake 23 is held away from the face of the rotary brake wheel 14, but as soon as the motor circuit is opened at a switch, the coils 18 become de-energized and the springs 25 will then force the disc 24 over against the brake lining 15 to stop the motor. In this connection it should be understood that the ends of the springs 25 thrust against the end of long blocks 31 (see Figs. 1 and 4).

In practicing this invention the motor may be wound in any manner desired but in order to obtain the beneficial results of this invention the coils 18 should be wired in pairs, the individual coils of each pair being disposed diametrically opposite to each other. These coils are indicated generally by the reference numeral 18, but in Fig. 4 18a indicates two coils constituting a pair that would be connected up in series, for example, to the conductor A, that is to say, the conductor carrying one phase; while the conductor B would be connected up to two other diametrically opposite coils 18b, and the conductor C would be connected up to the two remaining coils 18c. This is illustrated diagrammatically in Fig. 5. After passing through the coils the circuit through them is grounded by a ground lead 32, as indicated in Fig. 5. Such a ground in the motor is indicated in dotted lines at G.

In Fig. 5, M indicates the motor proper to which the three phase conductors A, B and C are connected, the other side of the motor being indicated as grounded by a ground lead 3 leading to the ground G'.

It will be evident that when an electromechanical brake having the features described is employed, as long as the current is flowing through the coils 18, these coils will always be energized in pairs, the individuals of which are located diametrically opposite to each other and equidistant from the center of the shaft; hence the magnetic forces acting to attract and hold the floating brake member against the cores of the energized coils will balance each other; developing a resultant force acting along the axis of the shaft. This overcomes any tendency of the brake to chatter, and keeps the brake at all times held secure so that the brake disc 24 is in its released position, and out of contact with the brake wheel 14. But when the current is broken, of course the springs 25 immediately apply the brakes.

Although I have described this invention as applied to a three phase alternating circuit, it should be understood that it can be applied in any polyphase circuit. However, if the current has more than three phases, this would necessitate increasing the number of coils 18 because there would have to be a pair corresponding to each phase.

I claim as my invention:

1. An armature brake for electric motors comprising, in combination with a motor casing and field coil attaching means, means associated with said casing and projecting inwardly thereof to define generally radially disposed abutment surfaces longitudinally spaced from said field coil attaching means, securing elements projecting axially from said abutment surfaces and secured to said field coil attaching means, an armature, a brake member affixed to said armature, a floating brake member arranged for coaction with said affixed brake member, diametrically opposed leaf springs secured to said floating brake member and having end portions abutted against said abutment surfaces and flexed between said surfaces and said floating brake member so as to bias the latter toward engagement with said affixed brake member, said end portions of said leaf springs being disposed on opposite sides of said securing elements and adapted to coact therewith for holding said floating brake member against torque induced rotation, and electromagnetic means associated with said floating brake member for moving the same axially out of engagement with said affixed brake member against the bias of said leaf springs when said motor is energized.

2. An armature brake for electric motors comprising, in combination with a motor casing having generally radially inwardly extending bosses provided with respective threaded openings, field coils mounted in said casing, and an armature: a brake disc affixed to said armature and having an axially facing braking surface; a floating brake ring arranged for braking coaction with said braking surface; abutment means projecting inwardly from said shell and axially spaced from said threaded boss, away from said field coils; a pair of arcuate leaf springs secured to said brake ring and having free end portions projecting circumferentially toward each other and spaced from each other, said free end portions being abutted against said abutment means and axially flexed between said abutment means and said floating brake ring so as to urge the latter into braking engagement with said braking surface; electromagnetic means associated with said brake ring and adapted when the motor is energized to draw said brake ring axially out of braking engagement with said braking surface; a removable end cap for said motor casing; and securing elements extending through said end cap, through said abutment means, and threaded into said threaded opening, for securing said cap to the motor casing, said securing elements passing through the spaces between said free ends of said springs and coacting with said free ends to resist braking torque induced rotation of said braking ring.

3. An armature brake for electric motors, comprising, in combination with a motor casing, field coil positioning means and an armature therein: radially arranged abutments in said casing, a brake element affixed to said armature and having an axially facing braking surface; a floating brake ring arranged to coact with said braking surface and axially shiftable out of braking engagement therewith; electromagnetic means for shifting said braking ring axially when said motor is energized; leaf spring means attached to said brake ring and having free end portions projecting therefrom and engageable with said abutments for placing said spring means under flexure biasing said braking ring for engagement with said braking surface; and means rigidly associated with said field coil attaching means and coacting with said free end portions in a manner to resist braking action torque induced rotation of said ring, and said spring means coacting with the motor casing to support said ring in coaxial relation to said affixed brake element.

4. An armature brake as defined in claim 3, wherein said projecting spring portions constitute the sole means for supporting and centering said braking ring, and for resisting rotation thereof.

5. An armature brake for electric motors comprising: a motor casing; means associated therewith and projecting inwardly to define abutment surfaces; field coil securing and positioning means; a head for said casing; head attaching means projecting from said abutment surfaces and secured to said field coil securing and positioning means; an armature; a brake member fixed to said armature; a floating brake member disposed adjacent thereto; yielding means secured to said floating brake member and having end portions engageable with said abutment surfaces for urging the floating brake member into engagement with the fixed brake member, said end portions of the yielding means being disposed on opposite sides of the head attaching means, and abutting thereagainst, for holding the floating brake member against rotation; and electromagnetic means for moving the floating member axially out of engagement with the fixed member against the bias of said yielding means when the motor is energized.

6. An armature brake for electric motors comprising: a motor casing; abutment surfaces adjacent the interior wall thereof; field coil attaching means; elements projecting from said abutment surfaces and secured to said field coil attaching means; an armature; a brake member fixed to said armature; a floating brake member adjacent thereto; leaf springs secured to said floating brake member and having end portions abutted against the abutment surfaces for urging the floating brake member into engagement with the fixed brake member, the free end portions of said springs abutting against the elements for inhibiting rotation of said floating brake member; and electromagnetic means for moving said floating brake member out of engagement with the fixed brake member.

JAMES E. CHAPMAN.

REFERENCES CITED

The following references are of record in the file of this patent:

UNITED STATES PATENTS

| Number | Name | Date |
| --- | --- | --- |
| 791,423 | Ihlder | May 30, 1905 |
| 744,773 | Lindquist | Nov. 24, 1903 |
| 2,009,121 | Price | July 23, 1935 |
| 2,077,888 | Larsh | Apr. 20, 1937 |
| 2,121,889 | Sousedik | June 28, 1938 |
| 1,812,836 | Whyte | June 30, 1931 |